(12) United States Patent  
Cassard et al.

(10) Patent No.: US 11,450,907 B2
(45) Date of Patent: Sep. 20, 2022

(54) BATTERY AND VEHICLE EQUIPPED WITH SAID BATTERY (71) Applicant: FAURECIA SYSTEMES D'ECHAPPEMENT, Nanterre (FR)

(72) Inventors: Jean-Baptiste Cassard, Nanterre (FR); Denis Lattay, Nanterre (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 0 days.

(21) Appl. No.: 16/415,507

(22) Filed: May 17, 2019

(65) Prior Publication Data

US 2019/0356028 A1 Nov. 21, 2019

(30) Foreign Application Priority Data

May 18, 2018 (FR) ...................................... 1854193

(51) Int. Cl.
*H01M 10/00* (2006.01)
*H01M 10/6556* (2014.01)
*H01M 10/613* (2014.01)
*H01M 10/625* (2014.01)
*H01M 10/6554* (2014.01)
*H01M 50/20* (2021.01)

(52) U.S. Cl.
CPC ..... *H01M 10/6556* (2015.04); *H01M 10/613* (2015.04); *H01M 10/625* (2015.04); *H01M 10/6554* (2015.04); *H01M 50/20* (2021.01); *H01M 2220/20* (2013.01)

(58) Field of Classification Search
CPC ........... H01M 10/6556; H01M 10/613; H01M 10/6554; H01M 2/1077; H01M 2220/20; H01M 2/1083; H01M 2/1094; H01M 220/20; Y02E 60/10
See application file for complete search history.

(56) References Cited

U.S. PATENT DOCUMENTS

2009/0242299 A1   10/2009   Takasaki et al.
2011/0318618 A1   12/2011   Yajima et al.
2012/0160088 A1   6/2012    Rawlinson
(Continued)

FOREIGN PATENT DOCUMENTS

CN      105172903 A        12/2015
DE      102012012663 A1    12/2013
(Continued)

OTHER PUBLICATIONS

French Search Report for Application No. 1854193, dated Oct. 22, 2018, 2 pages.

*Primary Examiner* — Cynthia H Kelly
*Assistant Examiner* — Monique M Wills
(74) *Attorney, Agent, or Firm* — Barnes & Thornburg LLP (57) ABSTRACT

A battery comprises: at least one electrical energy storage cell; an enclosure in which the at least one electrical energy storage cell is housed, the enclosure having a bottom made from a material with low thermal conductivity having at least one flow channel for a cooling fluid; a thermal plate made from a material with a high thermal conductivity, laying down on the bottom the thermal plate being in thermal contact with the at least one electrical energy storage cell; and a cradle, facing the bottom and separated from the bottom by a space.

20 Claims, 5 Drawing Sheets

(56) References Cited

U.S. PATENT DOCUMENTS

| | | | |
|---|---|---|---|
| 2012/0161429 A1* | 6/2012 | Rawlinson | B62D 21/157 |
| | | | 280/801.1 |
| 2012/0227931 A1 | 9/2012 | Heckenberger et al. | |
| 2015/0236314 A1 | 8/2015 | Lee et al. | |
| 2015/0336452 A1 | 11/2015 | Decker | |
| 2016/0141569 A1 | 5/2016 | Mascianica | |
| 2016/0222631 A1 | 8/2016 | Kohno | |
| 2019/0044203 A1* | 2/2019 | Haag | H01M 10/6556 |

FOREIGN PATENT DOCUMENTS

| | | |
|---|---|---|
| DE | 102013011895 A1 | 1/2015 |
| DE | 102016222550 A1 | 5/2018 |
| EP | 3214669 | 9/2017 |
| FR | 974453 A | 2/1951 |
| FR | 2974453 A1 | 10/2012 |
| JP | 2005317456 | 11/2005 |
| JP | 2006035940 | 2/2006 |
| JP | 2007012394 | 1/2007 |
| JP | 2013109845 A | 6/2013 |
| JP | 2014514694 | 6/2014 |
| JP | 2015224027 | 12/2015 |
| JP | 2017157542 | 9/2017 |
| WO | 2015115233 | 8/2015 |

\* cited by examiner

BATTERY AND VEHICLE EQUIPPED WITH SAID BATTERY

PRIORITY CLAIM

This application claims priority to French Application No. 1854193, filed May 18, 2018, which is expressly incorporated by reference herein.

BACKGROUND

The present disclosure relates to electricity storage batteries, in particular for automobiles.

SUMMARY

Automobiles propelled by electric motors can be equipped with high-capacity batteries for example containing cells of the Li Ion type. Such cells give off large quantities of heat when they are highly stressed. The operating temperature of these batteries must be controlled to avoid premature aging.

In this context, the present disclosure aims to propose a battery provided with an effective temperature management system, and that has an economical design.

To that end, according to a first aspect, the present disclosure relates to a battery comprising:
  at least one electrical energy storage cell;
  an enclosure in which the at least one electrical energy storage cell is housed, the enclosure having a bottom made from a material with low thermal conductivity having at least one flow channel for a cooling fluid;
  a thermal plate made from a material with a high thermal conductivity, laying down on the bottom, the thermal plate being in thermal contact with the at least one electrical energy storage cell;
  a cradle, facing the bottom and separated from the bottom by a space.

The cooling fluid is in thermal contact with the cells through a plate having a high thermal conductivity, such that the heat is discharged very effectively.

The bottom of the enclosure of the battery is used to create the circulation channels of the fluid, which is particularly economical. It is not necessary to add an additional element to create the circulation channels.

The cradle protects the battery against outside attacks. This cradle is a separate part from the enclosure and separate from the thermal plate, and can therefore be made from a material suitable for its protective screen function.

The space arranged between the bottom and the cradle creates a thermal protection, insulating the ducts from the outside.

These different functions are performed by three parts, typically in plate form, such that the design of the battery is simple and economical.

Within the meaning of the present disclosure, "plate" refers to an element whereof the main part is substantially flat, thin in light of its other dimensions, the main part possibly being ribbed.

The battery may further have the following features, considered individually or according to any possible combinations:
  the bottom is made from a composite or plastic material;
  the composite material comprises a thermoplastic or thermosetting material and a reinforcement, the reinforcement advantageously comprising fibers, a majority of the fibers being short fibers with a length smaller than 51 mm;
  the bottom has an inner face facing the thermal plate and an outer face facing the cradle, the inner face bearing reliefs delimiting the flow channels between them;
  the flow channels are open toward the thermal plate;
  the thermal plate is laying down on the reliefs and closes the channels;
  the cradle is made from a composite material;
  the composite material comprises a thermoplastic or thermosetting material and a reinforcement, the reinforcement advantageously comprising fibers, a majority of the fibers being continuous fibers with a length greater than 100 mm;
  the enclosure comprises an upper part tightly fastened to the bottom;
  the bottom is connected to the cradle at a plurality of points distributed over the surface of the bottom.

According to a second aspect, the present disclosure relates to a vehicle comprising a body and a battery having the above features, the cradle being directly fastened to the body.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
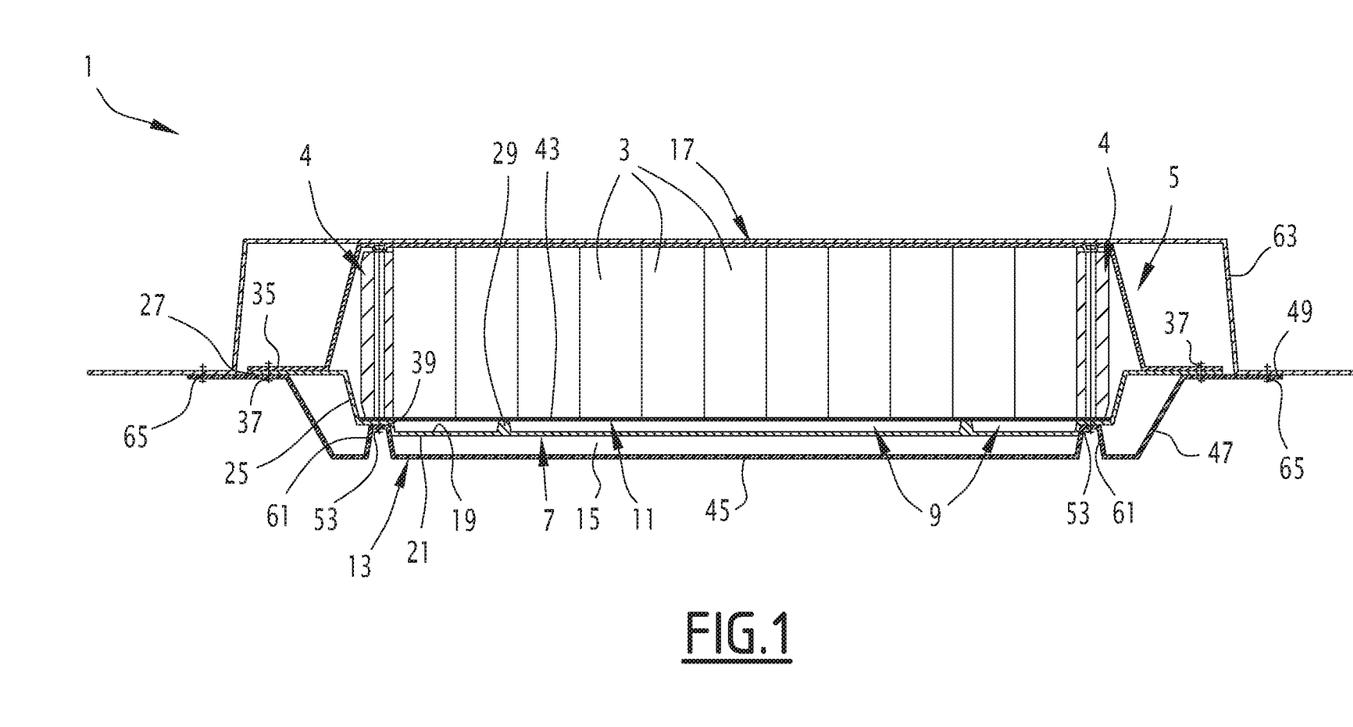
FIG. 1 is a schematic sectional view of a battery according to the present disclosure, cut away below the body of a vehicle.

The battery 1 shown in FIG. 1 is configured to store electrical energy. It is for example equipped with cells of the Li Ion type. In a variant, it is of another type.

The battery 1 is typically designed to equip a vehicle having an electric propulsion engine. In a variant, it is designed to equip a vehicle having a hybrid engine. The vehicle is typically an automobile, for example a car, a bus or a truck.

According to another variant, the battery 1 does not equip a vehicle, but a static installation.

The battery 1 comprises at least one electrical energy storage cell 3, and an enclosure 5 in which the at least one electrical energy storage cell 3 is housed.

Typically, the battery 1 comprises a large number of cells 3, electrically connected to one another, in series and/or in parallel.

The cells 3 are arranged against one another and form one or several blocks of the type illustrated in FIG. 1. The cells of a same block are arranged between two flanges 4, placed at the two opposite ends of the block. The cells 3 and the flanges 4 of a same block are secured by straps (not shown) or any other means.

The enclosure 5 completely surrounds the at least one cell 3. It is arranged to keep the cell(s) 3 in position. It inwardly delimits a tight volume with respect to the gases and liquids. It thus insulates the cell(s) 3 from the outside environment.

The enclosure 5 includes a bottom 7 made from a material with a low thermal conductivity, having at least one channel 9 for circulation of a cooling fluid.

The battery 1 also includes a thermal plate 11 made from a material with a high thermal conductivity, placed on the bottom 7. The thermal plate 11 is in thermal contact with the at least one electrical energy storage cell 3.

Here, being in thermal contact refers to the fact that the heat given off by the cells 3 is preferably transmitted to the thermal plate 11. The thermal plate 11 makes up a favored evacuation route for the heat coming from the cells 3.

The battery 1 also includes a cradle 13, facing the bottom 7 and separated from the bottom 7 by a space 15.

The bottom 7 corresponds to the zone of the enclosure 5 intended to be turned toward the bottom when the battery 1 is operating, for example when it is on board the vehicle.

The enclosure 5 comprises an upper part 17 fastened tightly to the bottom 7. The bottom 7 and the upper part 17 together completely surround the cell(s) 3.

Figure 2:
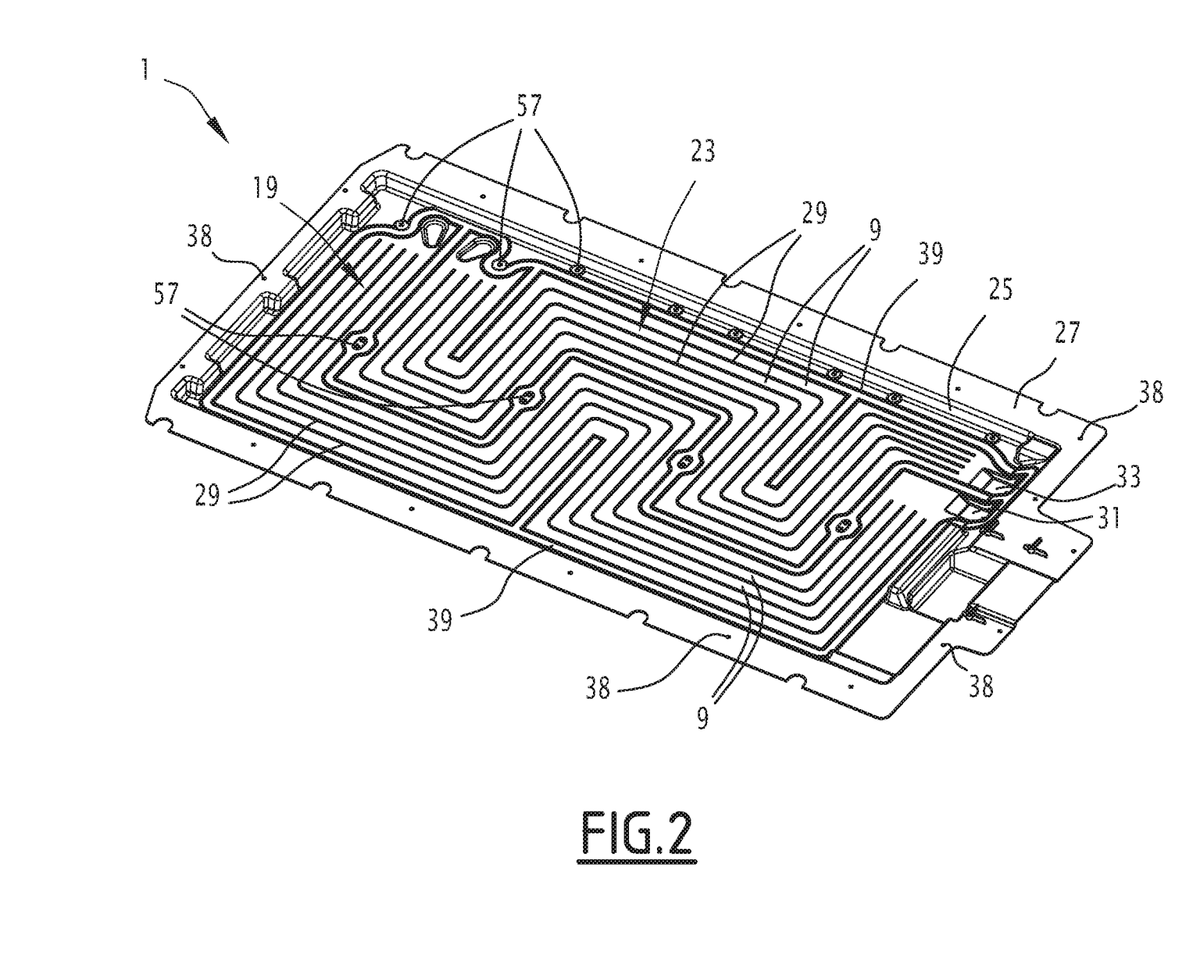
FIGS. 2 and 3 are perspective views, top and bottom, respectively, of the bottom of the enclosure of the battery of FIG. 1.
Figure 3:
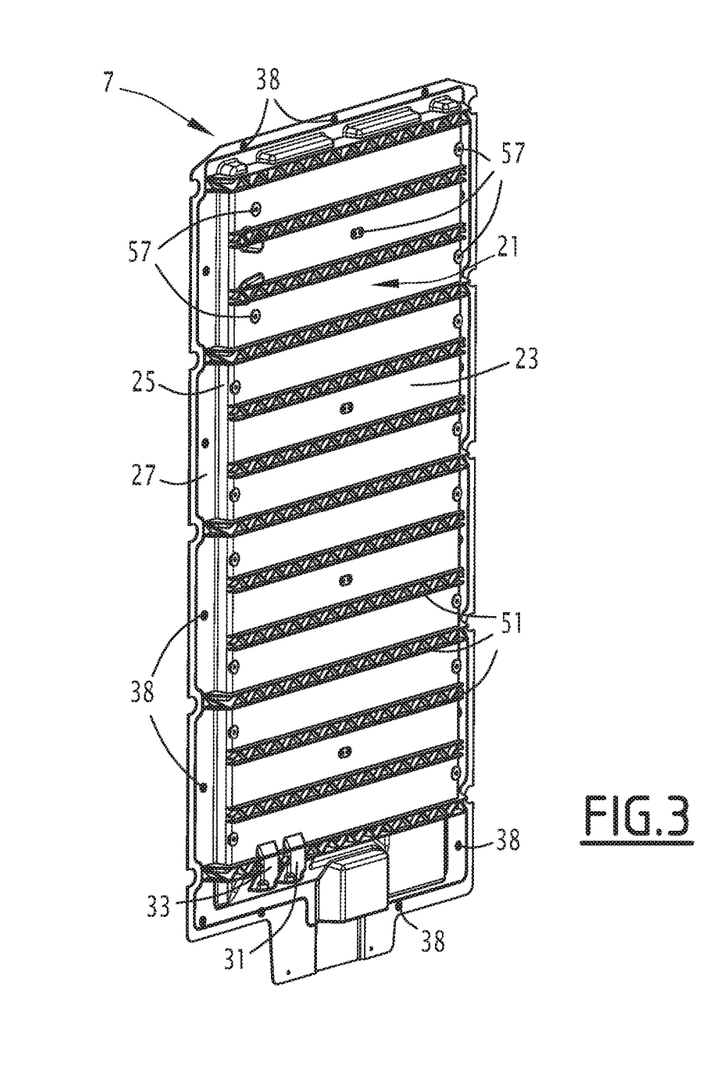

The bottom 7 is shown in more detail in FIGS. 2 and 3. It has an inner face 19 facing the thermal plate 11 and an outer face 21 facing the cradle 13. It includes a substantially flat zone 23, surrounded by an upright edge 25. The bottom 7 is thus in the form of a tub. The upright edge 25 extends over its periphery, toward the outside, by a collar 27.

The substantially flat zone 23 defines the inner and outer faces 19 and 21.

The inner face 19 bears reliefs 29 delimiting the flow channels 9 between them. These reliefs protrude toward the thermal plate 11 relative to the inner face 19. These are for example ribs. In a variant, the reliefs 29 have another shape.

The reliefs 29 are integral with the substantially flat zone 23.

The bottom 7 is typically obtained by molding. It is therefore manufactured very economically.

In a variant, the bottom 7 is obtained by blowing, or by additive manufacturing.

The reliefs 29 delimit the channels 9 between them. The latter fluidly connect a cooling fluid inlet 31 to a cooling fluid outlet 33. The inlet 31 and the outlet 33 are orifices arranged in the bottom 7, for example in the upright edge 25. The inlet 31 is provided to be connected to a cooling fluid feed. The outlet 33 is provided to be connected to a cooling fluid discharge.

The channels 9 are typically substantially parallel to one another, as shown in FIG. 2. They cover substantially the entire inner face 19 of the bottom 7.

The channels 9 are open toward the thermal plate 11.

The bottom 7 is advantageously made from a composite or plastic material.

The material of the bottom 7 has a low thermal conductivity, typically between about 0.15 $W \cdot m^{-1}$ and about 1.5 $W \cdot m^{-1}$, preferably between about 0.3 $W \cdot m^{-1}$ and about 1.2 $W \cdot m^{-1}$, still more preferably between about 0.5 $W \cdot m^{-1}$ and about 1 $W \cdot m^{-1}$.

The composite material preferably comprises a thermoplastic or thermosetting material and a reinforcement. As an example, these reinforcements can be fibers, a majority of the fibers being short fibers with a length smaller than 51 mm (2 inches). These short fibers are typically cut fibers.

Long fibers can be arranged at certain points of the bottom 7, so as to locally reinforce the bottom 7. These fibers have a length greater than 100 mm. These long fibers are also called continuous fibers.

Thus, in the material forming the bottom 7, at least 50% by weight of the fibers are short fibers, and less than 50% by weight of the fibers are long fibers.

The composite material is for example a material with a thermosetting matrix of the SMC (Sheet Molding Compound)/SMC with continuous fibers type.

In a variant, the composite material is for example a material with a thermoplastic matrix of the overmolded thermoplastic pre-impregnated type.

The bottom 7 typically has a thickness of between 2 mm and 7.5 mm.

The upper part 17 of the enclosure 5 is typically made from the same material as the bottom 7.

Such a material is easily shaped by molding and makes it possible to obtain the desired shapes for the bottom 7, in particular due to the use of technologies with thermosetting or overmolded thermoplastic pre-impregnated SMC/SMC with continuous fibers.

The upper part 17 of the enclosure 5 is typically in the shape of a cap. It includes an upper collar 35 provided to bear against the collar 27 of the bottom 7.

The collar 27 and the upper collar 35 are fastened to one another so as to be tight with respect to the gases and liquids, using all appropriate means. They are for example rigidly fastened to one another by mechanical members 37 such as screws or tie rods, with the insertion of a sealing gasket, not shown (FIG. 1). The mechanical members 37 are received in the orifices 38 of the bottom 7 (FIGS. 2 and 3). The orifices 38 are distributed all the way around the bottom 7.

Alternatively or additionally, the collar 27 and the upper collar 35 are glued to one another.

Figure 4:
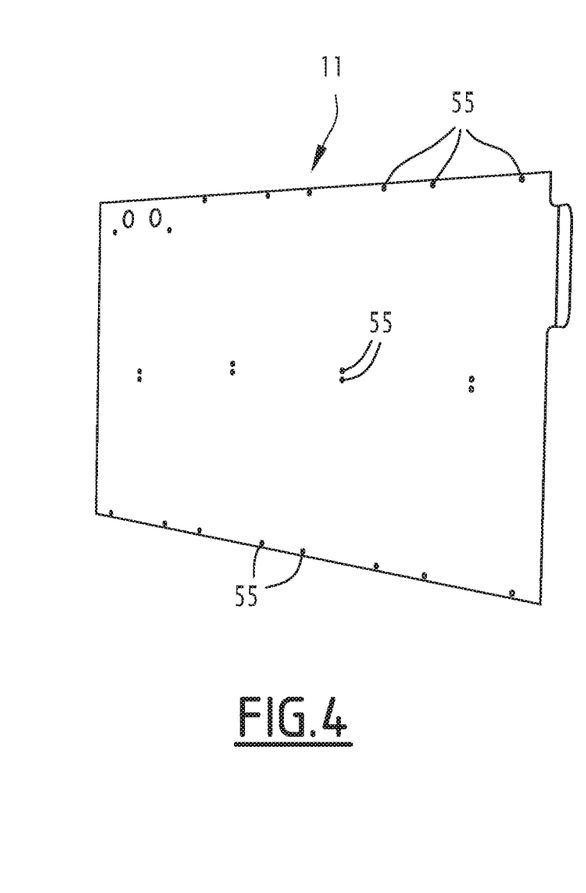
FIG. 4 is a perspective view of the thermal plate of the battery of FIG. 1.

The thermal plate 11 is substantially planar (FIG. 4). It is typically identical in size and shape to those of the substantially planar zone 23 of the bottom 7. In the illustrated example, it is rectangular, but in a variant, it has any other appropriate shape.

The thermal plate 11 is placed on the reliefs 29 of the inner face 19 of the bottom 7 and thus closes the channels 9 for circulation of a cooling fluid (FIG. 1). It is in contact with the apices of the reliefs 29 and connected on the periphery of the channels 9, tightly with respect to the cooling liquid, for example by gluing.

A step 39 (FIG. 1) is formed on the largest part of the perimeter of the substantially planar zone 23 of the bottom 7. The thermal plate 11 is also placed on the step 39 and is connected to the step 39 tightly with respect to the cooling liquid, for example by gluing.

The thermal plate 11 is made from a material with a high thermal conductivity, typically between about 50 $W \cdot m^{-1}$ and about 250 $W \cdot m^{-1}$, preferably between about 75 $W \cdot m^{-1}$ and about 200 $W \cdot m^{-1}$, still more preferably between about 100 $W \cdot m^{-1}$ and 150 $W \cdot m^{-1}$.

The material of the thermal plate 11 is preferably metallic, and is for example a steel, an aluminum or an aluminum alloy. The thermal plate 11 is typically a sheet of coated steel or an anodized or non-anodized aluminum sheet.

The cell(s) 3 rest on an upper face 43 of the thermal plate 11 (FIG. 1).

The thermal plate 11 is preferably directly in contact with the cell(s) 3, their packaging or their inserts. In a variant, the thermal plate 11 is in contact with the cell(s) 3 through a device guaranteeing homogeneous heat transmission, such as a thermal paste.

The thermal plate 11 typically has a thickness of between 0.2 and 1.5 mm, and preferably between 0.6 and 1 mm.

The cradle 13 (FIGS. 5 and 6) includes a substantially flat central part 45, surrounded by an upright edge 47. The upright edge 47 extends outward, on its periphery, by a protruding collar 49.

Figure 5:
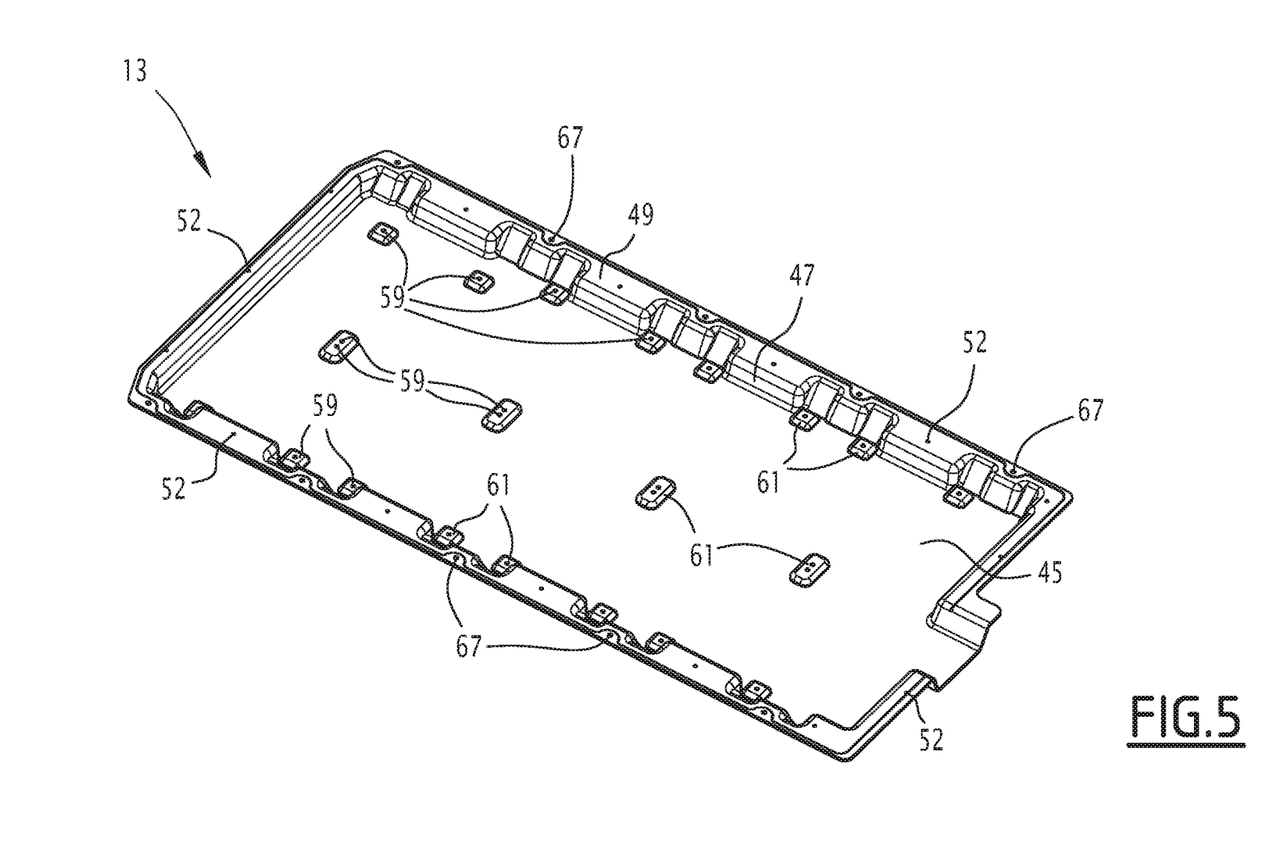
FIGS. 5 and 6 are perspective views, top and bottom, respectively, of the cradle of the battery of FIG. 1.
Figure 6:
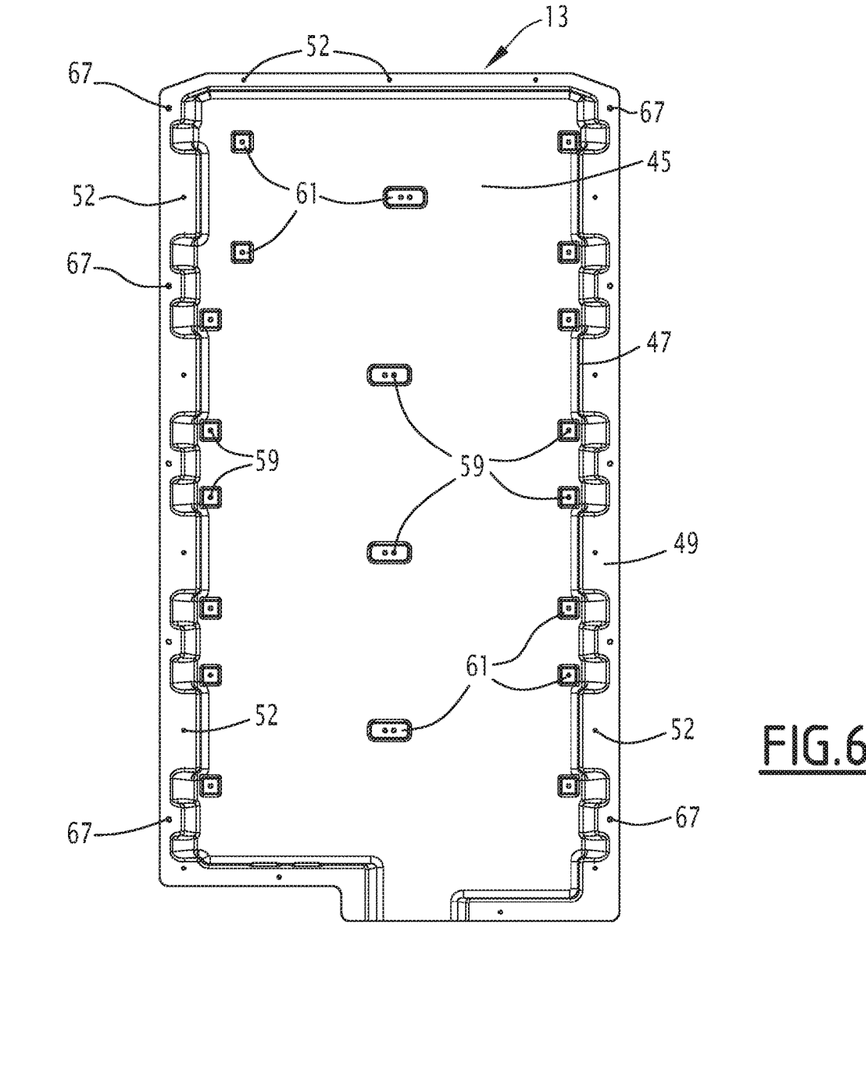

The cradle 13 is thus in the form of a concave tub for receiving the bottom 7.

The central part 45 has a size larger than that of the substantially planar zone 23 of the bottom 7.

The substantially planar zone 23 of the bottom 7 is housed inside the cradle 13. Typically, the bottom 7 is practically entirely housed inside the cradle 13, the upright edge 47 completely surrounding the bottom 7.

The collar 27 of the bottom 7 rests on the protruding collar 49 of the cradle 13.

The central part 45 of the cradle 13 is substantially parallel to the substantially planar zone 23 of the bottom 7. The space 15 thus extends along the entire surface of the substantially planar zone 23.

The substantially planar zone 23 bears, on its outer face 21, ribs 51 (FIG. 3), which bear on the central part 45 of the cradle 13. These ribs 51 form spacers that define the height of the space 15 separating the bottom 7 of the cradle 13.

The space 15 thermally insulates the ducts 9 from the outside. The space also offers an impact absorbing travel below the vehicle.

It typically has a height of between 2.5 and 20 mm.

The mechanical members 37 also secure the protruding collar 49 to the collar 27 and the upper collar 35, respectively belonging to the bottom 7 and the upper part 17 of the enclosure 5. They are received in orifices 52 arranged in the cradle 13.

Preferably, the thermal plate 11, the bottom 7 and the cradle 13 are rigidly fastened to one another by mechanical members 53 such as screws or tie rods, with insertion of sealing gaskets, not shown.

These mechanical members 53 are for example arranged in three rows substantially parallel to one another, two rows along outer edges of the thermal plate 11 and one median row of the plate 11. The mechanical members 53 pass through the thermal plate 11 through the orifices 55 (FIG. 4), pass through the substantially planar zone 23 of the bottom 7 through the orifices 57 (FIGS. 2 and 3), and pass through the central part 45 of the cradle 13 through the orifices 59 (FIGS. 5 and 6).

The thermal plate 11 is connected to the bottom 7 tightly around the mechanical members 53 passing through it, for example by gluing.

The orifices 59 are located at the apex of the bosses 61, formed in the central part 45 of the cradle 13.

The mechanical members 53 typically also pass through the upper part 17 of the enclosure 5 and the flanges 4.

The mechanical members 37 and 53 thus ensure the mechanical cohesion of the enclosure 5, the thermal plate 11 and the cradle 13.

Thus, the bottom 7 is advantageously connected to the cradle 13 at a plurality of points distributed over the surface of the bottom 7. This makes it possible to impart a great rigidity to the structure supporting the cell(s) 3, namely to the structure formed by the thermal plate 11, the bottom 7 and the cradle 13, in the location where the mass of the cell(s) is centered. The cell(s) are particularly heavy. For an electrically propelled vehicle, these cells have a weight of about 50 kg to about 5 tons, and more specifically from about 50 kg to about 750 kg for an automobile and from about 150 kg to about 5 tons for a bus or truck.

The ribs 51 also contribute to the rigidity of said structure.

The cradle 13 is advantageously made from a composite material.

The composite material preferably comprises a thermoplastic or thermosetting material and a reinforcement. As an example, these reinforcements can be fibers, a majority of the fibers being continuous fibers with a length greater than 100 mm.

Thus, in the material forming the cradle 13, at least 50% by weight of the fibers are continuous fibers.

These long fibers are advantageously arranged in several layers, with orientations chosen to obtain an excellent mechanical strength as a function of the stresses.

The thermosetting material is for example a polyester, a vinyl ester, an epoxy, an acrylic, or a bio-sourced resin. The thermoplastic material is for example a synthetic or bio-sourced thermoplastic resin.

The reinforcement is for example a glass, basalt, carbon, aramid, or HMPP (high-modulus polypropylene) fiber. As a variant, the reinforcement is made from linen, hemp, or is another bio-sourced fiber.

Thus, the cradle 13 is made from a particularly rigid and mechanically strong material.

It ensures the protection of the cell(s) 3 with respect to outside attacks.

When the battery 1 is mounted on board a vehicle, the cradle 13 reacts the forces experienced by the battery 1 to transmit them to the structure of the vehicle. The transmitted forces are typically accelerations, vertical and/or horizontal. These accelerations for example result from the normal movement of the vehicle, irregularities of the rolling surface, or impacts experienced by the vehicle.

When the battery 1 is mounted on board the vehicle, the cradle 13 protects the cells 3 from intrusions coming either from below from obstacles present on the road, or from the sides by participating in protecting the cells 3 during the lateral impact.

Typically, the cradle 13 transmits the forces directly to the body 63 of the vehicle (FIG. 1).

To that end, the cradle 13 is rigidly fastened to the body 63 by mechanical members 65, such as screws, tie rods, or any other fastening means. These mechanical members 65 are received in orifices 67 arranged in the protruding collar 49 of the cradle 13 (FIGS. 5 and 6).

Thus, the battery 1 of the present disclosure comprises a first structure made from a composite material ensuring the housing of the cells whereof shaping is easier, and a second structure made from a structurally stronger composite material ensuring the protection of the latter but the shaping of which is more difficult. The first structure is the bottom 7. Because it can be relatively more easily shaped, it is possible to create cooling fluid circulation channels at a lower cost in the bottom 7.

The second structure is the cradle 13. Its mechanical strength allows it to perform its protection and force reacting functions. It is, however, made from a material not making it easily possible to obtain complex ribbed shapes, in particular the cooling channels.

The battery 1 is typically fastened below the body 63, as illustrated in FIG. 1. In a variant, it is placed on board the vehicle in any other manner.

The battery 1 has been described for a case where the circulation channels 9 are delimited by reliefs formed in the bottom 7. In a variant, the circulation channels 9 are tubes laying down on the bottom 7, or are formed in any other suitable manner.

The invention claimed is:

1. A battery, comprising:
   at least one electrical energy storage cell;
   an enclosure in which the at least one electrical energy storage cell is housed, the enclosure having a bottom made from a material with a low thermal conductivity having at least one flow channel for a cooling fluid;
   a thermal plate made from a material with a high thermal conductivity, laying down on the bottom, the thermal plate being in thermal contact with the at least one electrical energy storage cell; and
   a cradle, facing the bottom and separated from the bottom by a space;
   wherein the cradle is rigidly fastened to a body of the vehicle by mechanical members, such that the cradle transmits the forces applied to the battery to the body of the vehicle, and
   wherein the bottom, the thermal plate, and the cradle are secured to one another by other mechanical members.

2. The battery of claim 1, wherein the bottom is made from a composite or plastic material.

3. The battery of claim 2, wherein the composite material comprises a thermoplastic or thermosetting material and a reinforcement, the reinforcement comprising fibers, a majority of the fibers being short fibers with a length smaller than about 51 mm.

4. The battery of claim 1, wherein the bottom has an inner face facing the thermal plate and an outer face facing the cradle, the inner face bearing reliefs delimiting the at least one flow channel between them.

5. The battery of claim 4, wherein the at least one flow channel is open toward the thermal plate.

6. The battery of claim 5, wherein the thermal plate is laying down on the reliefs and closes the at least one flow channel.

7. The battery of claim 1, wherein the cradle is made from a composite material.

8. The battery of claim 7, wherein the composite material comprises a thermoplastic or thermosetting material and a reinforcement, the reinforcement comprising fibers, a majority of the fibers being continuous fibers with a length greater than about 100 mm.

9. The battery of claim 1, wherein the enclosure comprises an upper part fastened tightly to the bottom.

10. The battery of claim 1, wherein the bottom is connected to the cradle at a plurality of points distributed over a surface of the bottom.

11. A vehicle comprising a body and a battery according to claim 1, the cradle being fastened directly to the body.

12. The vehicle of claim 11, wherein the cradle transmits the forces applied to the battery to the body of the vehicle.

13. A battery, comprising:
    at least one electrical energy storage cell;
    an enclosure in which the at least one electrical energy storage cell is housed, the enclosure having a bottom made from a material with a low thermal conductivity having at least one flow channel for a cooling fluid;
    a thermal plate made from a material with a high thermal conductivity, laying down on the bottom, the thermal plate being in thermal contact with the at least one electrical energy storage cell; and
    a cradle, facing the bottom and separated from the bottom by a space;
    wherein the cradle is arranged for being rigidly fastened to a body of the vehicle by mechanical members, such that the cradle transmits the forces applied to the battery to the body of the vehicle,
    wherein the cradle is fastened directly to the body by said mechanical members, only the cradle is fastened to the body of the vehicle by said mechanical members, the bottom is fastened to the cradle, and the bottom is not directly fastened to the body of the vehicle.

14. The battery of claim 1, wherein the other mechanical members are received in respective orifices of the bottom, the thermal plate and the cradle.

15. The battery of claim 1, wherein the enclosure comprises an upper part secured to the bottom, the thermal plate and the cradle by the other mechanical members.

16. The battery of claim 1, wherein the electrical energy storage cells are arranged against one another and form one or several blocks, the electrical energy storage cells of a same block are arranged between two flanges, placed at the two opposite ends of the block, the electrical energy storage cells and the flanges of a same block being secured to one another, the other mechanical members passing through the flanges.

17. The battery of claim 14, wherein the orifices are arranged in respective central, substantially planar zones of the bottom and the cradle.

18. The battery of claim 17, wherein the bottom and the cradle comprise respective raised edges surrounding the substantially planar zones and respective collars extending the raised edges outward, the respective collars of the bottom and the cradle being secured to one another by additional mechanical members.

19. The battery of claim 18, wherein the mechanical members secure the collar of the cradle to the body of the vehicle.

20. The battery of claim 17, wherein the substantially planar zone of the bottom bears ribs which rest on the substantially planar zone of the cradle.

* * * * *